United States Patent [19]
Wood et al.

[11] 3,797,762
[45] Mar. 19, 1974

[54] SEWAGE COMMINUTOR
[75] Inventors: Howard J. Wood, Largo; James A. Greiner, Clearwater both of Fla.
[73] Assignee: Engineered Products, Clearwater, Fla.
[22] Filed: July 24, 1972
[21] Appl. No.: 274,735

[52] U.S. Cl. ............................... 241/36, 241/46.11
[51] Int. Cl. ............................................. B02c 13/31
[58] Field of Search .......... 241/33, 36, 46.11, 46.17

[56] References Cited
UNITED STATES PATENTS
| | | | |
|---|---|---|---|
| 2,852,200 | 9/1958 | Holzer | 241/46.11 |
| 2,678,775 | 5/1954 | Simmons | 241/36 X |
| 2,852,199 | 9/1958 | Holzer | 241/46.11 X |
| 3,545,684 | 12/1970 | Ruspino et al. | 241/33 |

*Primary Examiner*—Custer, Jr. Granville Y.
*Attorney, Agent, or Firm*—Stein, Orman & Fisher

[57] ABSTRACT

An anti-clogging sewage comminutor comprising a housing including an inlet port formed in the side thereof and a surge port formed opposite an inlet port. In addition an outlet port is formed in the bottom thereof and a reversible motor is attached to the housing by a motor adapter. A cutter means comprising a circular rotor disc is disposed within the interior of the housing and a V-shaped double-edge cutter bar is connected to the interior wall of housing and extends outwardly therefrom in operative relation to each other. An outlet port is disposed beneath the cutter bar and rotor disc where by solid waste material pumped into the housing is reduced by the shearing action between the cutter bar and rotor disc and passed from the outlet port into the sewage line. The reversible motor changes whenever the rotor disc becomes jammed causing the rotor disc to reverse direction and oscillate until free.

4 Claims, 3 Drawing Figures

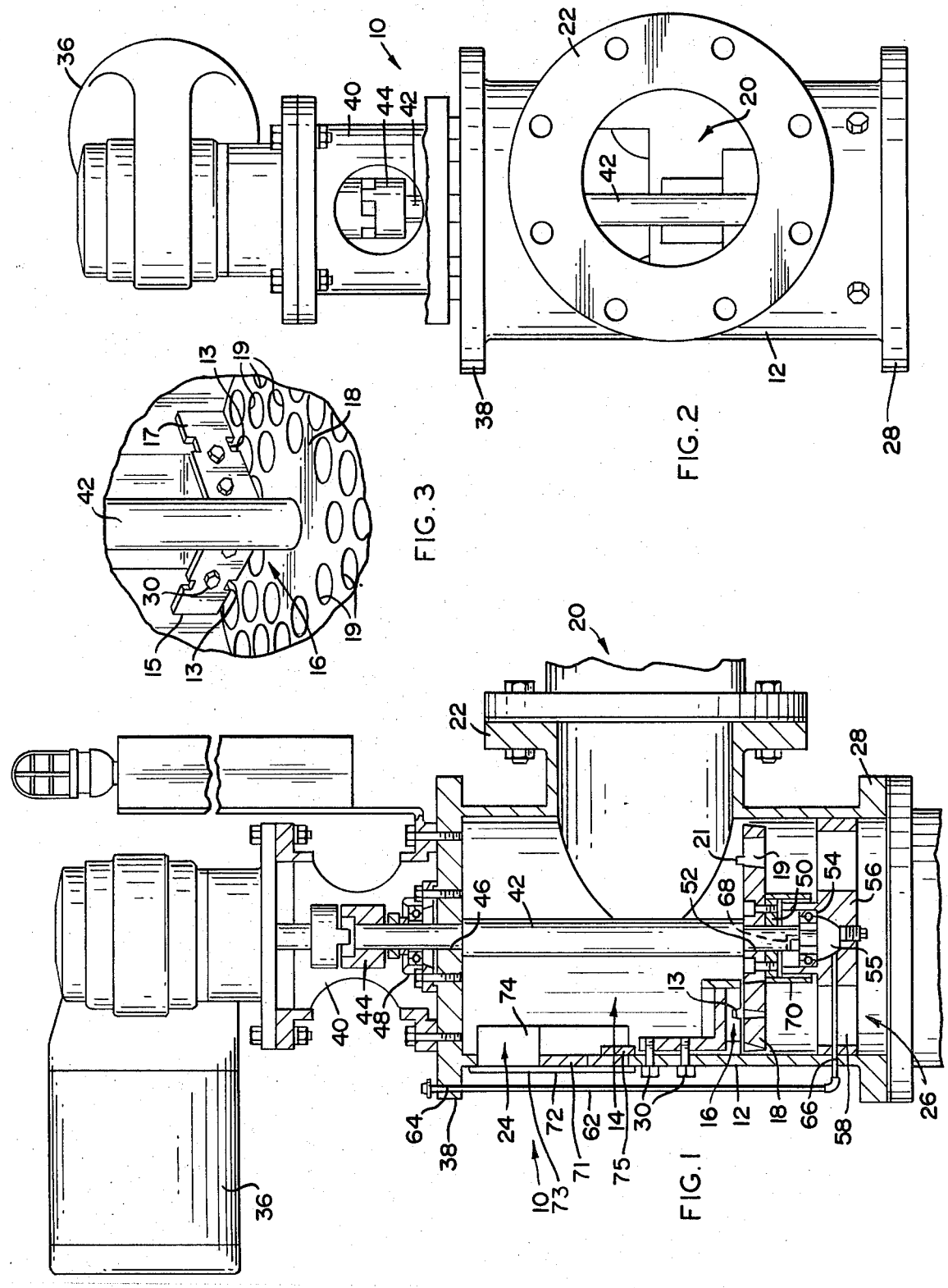

SEWAGE COMMINUTOR

BACKGROUND OF THE INVENTION

1. Field of the Invention

This invention relates to an anticlogging comminutor including a reversible motor and double-edge cutting bar for reversing comminutor rotation whenever the cutting assembly becomes jammed.

2. Description of the Prior Art

With increased urbanization and concentration of population, the problems associated with sewage disposal have increased immensely. In high density population areas, sewage systems commonly comprise a network of pipes or conduits for conveying raw sewage from points of origin, such as houses, factories and other buildings to a disposal area located a safe distance from the center of population.

In the past, low density population areas sewage was usually disposed of in the soil using septic tanks and cesspools. Unfortunately, with the population increases, even this technique becomes undesirable since it is basically unsanitary. As a result, various types of sewage treatment systems have been developed.

Notwithstanding improved sewage treatment and processing systems, transporting the raw sewage remains a major problem. The introduction of large solid waste materials such as towels, sanitary napkins, and other fabric products often interfers with the flow of effluent and may obstruct various portions of the system. To reduce these and other solids present in the sewage system, comminutors are used to reduce the size of the solids by shredding or tearing the solids. Since the operation of the comminutor is vital to the effective operation of any sewage system, failure of the comminutor to function properly often disables the system and treatment plants.

In the larger treatment systems, comminutors are usually driven continuously to reduce solids to small particles before entering the treating or processing. Numerous attempts have been made to design a comminutor that will not become clogged or jammed by the solid waste materials. A commonly used comminutor rotates in one direction for a predetermined period of time and then automatically reverses the direction of rotation for an equal period of time. Unfortunately, certain waste materials, such as fabric, becomes clogged in the cutting assembly regardless of the direction of rotation.

Still another comminutor includes an overpowered motor to insure grinding or shearing the solid wastes. In addition to being generally ineffective in avoiding jamming, the overpowered motor requires excesssive power and often expensive mechanical repairs.

Thus, it is obvious that an effective, anti-clogging comminutor be designed and manufactured at a commercially reasonable cost.

SUMMARY OF THE INVENTION

This invention relates to an anti-clogging sewage comminutor. More specifically, the comminutor comprises a housing having a cutting assembly disposed therein, a reversible motor operatively coupled to the cutting assembly and means to automatically reverse the direction of the motor and the cutting assembly when jammed to provide continuous, unattended operation.

The housing comprises a substantially cylindrical housing having an inlet port formed in the side thereof, a surge port formed opposite the inlet port and an outlet port formed in the bottom thereof. Both the inlet and outlet ports include flanges configured to operatively couple the comminutor to the sewage system.

The cutting assembly comprises a horizontally disposed circular rotor disc and a double-edge cutter bar extending from the interior wall of the housing. The rotor disc and cutter bar are arranged relative to each other such that relative motion therebetween creates a shearing or cutting action. The rotor disc also includes a plurality of apertures formed thereon.

The reversible motor is externally attached to the upper portion of the housing by a motor adapter. Extending downwardly from the motor and into the housing is a vertically disposed rotor shaft which operatively interconnectes the motor to the rotor disc.

In operation, waste is pumped through the sewage system and into the comminutor via the inlet port. As the waste enters the housing, the effluent passes through the apertures formed in the rotor disc and outlet port and continues along the system. Solids larger than the rotor disc apertures are caught above the rotor disc. As the rotor disc rotates relative to the fixed cutter bar, these larger solids are broken up by the shearing action therebetween. When the rotor disc becomes jammed by solid waste such as fabric material and the like, the motor automatically reverses rotational direction. Since the cutter bar is double-edge, a shearing action is generated in the opposite direction, and continues to operated in this direction indefinitely or until jammed by another piece of debris contained in the sewage. A pin extends upwards, out of the top of the rotor disc to snag and pull material into the cutter bar thus forcing all material to the cutting edge rather than pile up as in other devices. The motor and rotor disc will continue to oscillate so long as the rotor disc is jammed. Once freed the rotor disc will continue to rotate in the same direction. As the solid waste is reduced sufficiently in size, it will pass through the apertures and the outlet port with the effluent.

When the quantity of sewage is greater than can be handled by the comminutor either through a surge of waste or difficulty in breaking up the solids, the excess effluent will pass through the surge port and continue along the sewage system. The surge port includes a cover piece which consists of a series of bars over the port or opening to intercept any pieces in the sewage which may have been carried along with the liquid during an unexpected surge, thus further protecting the sewage system.

Thus, and effective continuously operating comminutor capable of unattended operation is provided with a minimum structural and mechanical complexity.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with accompanying drawings which:

FIG. 1 shows a cross-sectional side view of the sewage comminutor.

FIG. 2 shows a front view of the sewage comminutor.

FIG. 3 shows a detailed view of the double-edge cutter blade.

Similar reference characters refer to similar parts throughout the several views of the drawings.

DETAILED DESCRIPTION OF THE PREFERRED EMBODIMENT

As shown in FIG. 1, the sewage comminutor generally indicated as 10 comprises a substantially cylindrical upright housing 12 including cylindrical recess 14 formed therein to house a cutting assembly including shear means or cutter bar 16 and rotor disc 18.

The housing 12 includes inlet port 20 including annular interconnecting flange 22, surge port 24 formed in the side opposite the inlet port 20 and outlet port 26 including annular interconnecting flange 28.

As best shown in FIG. 3, the cutter bar 16 comprises a double-edge substantially V-shaped cutting bar including members 15 and 17 extending inwardly from the interior wall of the housing 12. The cutter bar 16 is detachably connected to housing 12 by fastening means 30. A notch 13 is formed on the bottom surface of cutter bar 16.

The rotor disc 18 comprises a horizontally disposed circular plate including a plurality of apertures 19 formed therethrough. Drag pin means 21 extends upwardly from the disc 18 at a radius to pass through notch 13 of cutter bar 16. Drag pin means 21 and notch 13 cooperatively form a drag cutter means as more fully described hereinafter.

A reversible motor 36 is externally attached to the upper portion 38 of the housing 12 by a motor adaptor 40. The motor 36 is interconnected to the rotor disc 18 by means of vertically disposed rotor shaft 42 operatively connected to the motor 38 by coupling means 44. The upper portion of rotor shaft 42 extends through aperture 46 formed in the upper wall 38 of housing 12 and is connected to top bearing mount 48. The lower end of rotor shaft 42 extends through rotor bushing 50 disposed within aperture 52 of rotor disc 18 into operative engagement with bottom bearing means 54 supported by bearing mount 56 which is centrally disposed within spinder casting 58 attached to the lower portion of housing 12.

The comminutor 10 further includes lubricating means comprising substantially L-shaped conduit 62 extending through aperture 64 formed on the upper surface 38 extending downard and through aperture 66 formed in the side wall of housing 12 and through lower bearing support 56 of communicate with cup-shaped reservoir 55. A substantially L-shaped passage 68 is formed in the lower portion of rotor shaft 42 whereby the lubricant from reservoir 55 is communicated to the inner portion of bearing support 56 and rotor bushing 50. A substantially cylindrical water guard member 70 depends downwardly from the lower surface of the rotor disc 18 to isolate the interior of recess 14 from rotor bushing 50 and bearing 54.

As shown in FIG. 1, to prevent large solid particles from passing through surge port 24, and at the same time allow overflow from recess 14 during periods of effluent surge detachable door 72 including base plate 71 substantially vertical parallel spaced bars 73 attached thereto is an attachment lip 75 extending downwardly from the rear portion of plate 71 is used to filter the flow through aperture 24.

The comminutor 10 is integrated into the sewage system by connecting inlet and outlet ports 20 and 26 respectively to the sewage system by the flanges 22 and 28 respectively. In operation, waste is pumped through the sewage system and into the comminutor 10 via the inlet port 20. As the waste enters the housing 12, the effluent passes down through apertures 17 and outlet port 26 and continues along the system. Solids larger than the rotor disc apertures 19 are caught above the rotor disc 18. As the rotor disc 18 rotates relative to the fixed cutter bar 16, these larger solids are broken up by the shearing action therebetween. To prevent clogging or jamming between the cutting assembly, drag pin 21 generally pulls fabric and other solid materials through the notched portion 13 of cutter bar 16 rather than allowing the waste to pile up in front of the cutter bar 16. When the rotor disc 18 does become jammed by solid waste such as fabric material and the like, the motor 36 automatically reverses rotational direction by means commonly known in the act. Since the cutter bar 16 is double-edge a shearing action is generated in the opposite direction. The motor 38 and rotor disc 18 will continue to oscillate so long as the rotor disc is jammed. Once free, the rotor disc 18 will continue to rotate in the same direction of travel. It should be noted that no recycling and delay time is required by the device 10. As the solid waste is reduced sufficiently in size it will pass through the apertures 19 and the outlet port 26 with the effluent.

In the event the quantity of sewage is greater than can be handled by the comminutor 10, either through a surge of waste or difficulty in breaking up the solids, the excess effluent will pass through the surge port 24 and continue along the sewage system. As previously described, the spaced parallel vertical bars 74 prevent solids from continuing in the sewage system without having been sheared by the cutting assembly.

It will thus be seen that the objects set forth above, among those made apparent from the preceeding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

What is claimed is:

1. A sewage comminutor for use in combination with a reversible motor, said sewage comminutor comprising a housing having a recess formed therein, an inlet and outlet port formed in said housing communicating with said recess, a cutting assembly disposed within said recess, said cutting assembly comprises stationary shear means affixed to the inner wall of said housing and a substantially horizontal rotor disc affixed to said interconnecting shaft, said shear means comprises a support member carrying a pair of elements extending inwardly into said recess in a substantially V-shaped member said elements arranged immediately adjacent and substantially parallel to said rotor disc, said rotor disc having at least one aperture formed theron, whereby the effluent sewage fed into said recess through said inlet port passes through said aperture and said outlet port and solid waste of a size greater than said aperture is broken up by cooperative shearing action between said shear means and said rotor disc and passed through said said shear means and said rotor disc and passed through said aperture and said outlet port, an interconnecting shaft operatively interconnecting the reversible motor and said rotor disc, the reversible motor and said rotor disc, the reversible motor oscillating at a predetermined lead to shear the solid waste in opposing directions so long as the load exceed said predetermined load and wherein said rotor disc will continue in one direction so long as the lead remains below said predetermined level.

2. The sewage comminutor of claim 1 further including drag cutter means comprises at least one drag pin extending upwardly from said rotor disc and a corresponding notch formed on said shear means such that upon rotation of said rotor disc relative to said shear means said drag pin passes through said notch.

3. The sewage comminutor of claim 1 wherein said housing further includes a surge port to accommodate overflow from said recess.

4. The sewage comminutor of claim 3 further including a detachable surge port door operatively engaging said housing to partially close said surge port whereby effluent may pass through said partially closed surge port while solid waste exceeding said aperture size is retained within said recess and sheared by said cutting assembly.

* * * * *